United States Patent
Kono

(10) Patent No.: US 10,532,682 B2
(45) Date of Patent: Jan. 14, 2020

(54) VIBRATION GENERATOR

(71) Applicant: CLARION CO., LTD., Saitama-shi (JP)

(72) Inventor: Kenji Kono, Tokyo (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 16/375,920

(22) Filed: Apr. 5, 2019

(65) Prior Publication Data

US 2019/0232841 A1 Aug. 1, 2019

Related U.S. Application Data

(63) Continuation of application No. 15/736,757, filed as application No. PCT/JP2016/070234 on Jul. 8, 2016, now Pat. No. 10,293,729.

(30) Foreign Application Priority Data

Jul. 10, 2015 (JP) .................................. 2015-138391

(51) Int. Cl.
*B60N 2/90* (2018.01)
*A47C 7/72* (2006.01)
*B06B 1/04* (2006.01)

(52) U.S. Cl.
CPC .................. *B60N 2/90* (2018.02); *A47C 7/72* (2013.01); *B06B 1/045* (2013.01); *B60N 2002/981* (2018.02)

(58) Field of Classification Search
None
See application file for complete search history.

(56) References Cited

U.S. PATENT DOCUMENTS 4,064,376 A 12/1977 Yamada
5,256,920 A * 10/1993 Porzio ..................... B06B 1/045
310/13

(Continued)

FOREIGN PATENT DOCUMENTS

CN 1167701 12/1997
CN 101243477 8/2008

(Continued)

OTHER PUBLICATIONS

International Search Report for corresponding International Application No. PCT/JP2016/070234, dated Sep. 27, 2016.

(Continued)

*Primary Examiner* — David E Allred
(74) *Attorney, Agent, or Firm* — Mori & Ward, LLP

(57) ABSTRACT

A vibration generator includes a vibration transmission member and an exciter. The vibration transmission member is disposed in a seat beneath a seat surface of the seat so as to extend longitudinally in a horizontal direction of the seat surface and is able to transmit a vibration in an extending direction of the vibration transmission member in which the vibration transmission member extends longitudinally. The exciter includes a voice coil, a permanent magnet disposed in the vicinity of the voice coil, a yoke supporting the permanent magnet. The exciter transmits the vibration to the vibration transmission member as the yoke and the voice coil approach or leave to each other. The yoke and the voice coil approach or leave in the same direction as the extending direction of the vibration transmission member.

2 Claims, 5 Drawing Sheets

(56) References Cited

U.S. PATENT DOCUMENTS

| | | |
|---|---|---|
| 5,387,026 A | 2/1995 | Matsuhashi et al. |
| 5,535,853 A | 7/1996 | Skalski |
| 5,813,234 A | 9/1998 | Wighard |
| 5,820,006 A | 10/1998 | Turner |
| 6,056,357 A | 5/2000 | Fukuoka |
| 2002/0017824 A1* | 2/2002 | Sakai ............... B06B 1/045 310/81 |
| 2002/0114487 A1 | 8/2002 | Maekawa |
| 2006/0255920 A1 | 11/2006 | Maeda et al. |
| 2007/0241595 A1 | 10/2007 | Nathan et al. |
| 2009/0099721 A1 | 4/2009 | Imai et al. |
| 2009/0227913 A1 | 9/2009 | Moriyama et al. |
| 2015/0020308 A1 | 1/2015 | Reichle |
| 2015/0165969 A1 | 6/2015 | Cha et al. |
| 2016/0212547 A1* | 7/2016 | Kang ............... B06B 1/045 |
| 2017/0297463 A1 | 10/2017 | Yoshikawa et al. |
| 2018/0289585 A1 | 10/2018 | Murison |

FOREIGN PATENT DOCUMENTS

| | | |
|---|---|---|
| CN | 201784492 U | 4/2011 |
| CN | 204444960 U | 7/2015 |
| JP | 61-85985 U | 6/1986 |
| JP | 06-113932 | 4/1994 |
| JP | 2009-120015 | 6/2009 |
| JP | 2009-255809 | 11/2009 |

OTHER PUBLICATIONS

Written Opinion for corresponding International Application No. PCT/JP2016/070234, dated Sep. 27, 2016.

English translation of the Written Opinion for corresponding International Application No. PCT/JP2016/070234, dated Jan. 16, 2018.

Chinese Office Action for corresponding CN Application No. 201680032551.3, dated Jan. 21, 2019.

Supplementary European Search Report for corresponding EP Application No. 16824395.4, dated Feb. 14, 2019.

European Search opinion for corresponding EP Application No. 16824395.4, dated Feb. 22, 2019.

Office Action with Form PTO-892 Notice of References Cited issued by the U.S. Patent and Trademark Office for the U.S. Appl. No. 15/736,757, dated Jun. 29, 2018.

Notice of Allowance with Form PTO-892 Notice of References Cited issued by the U.S. Patent and Trademark Office for the U.S. Appl. No. 15/736,757, dated Jan. 7, 2019.

* cited by examiner

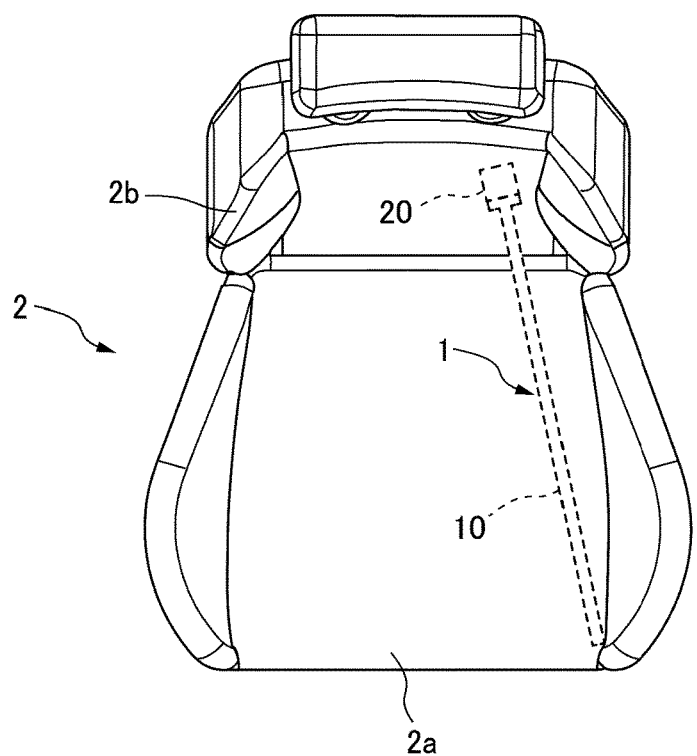
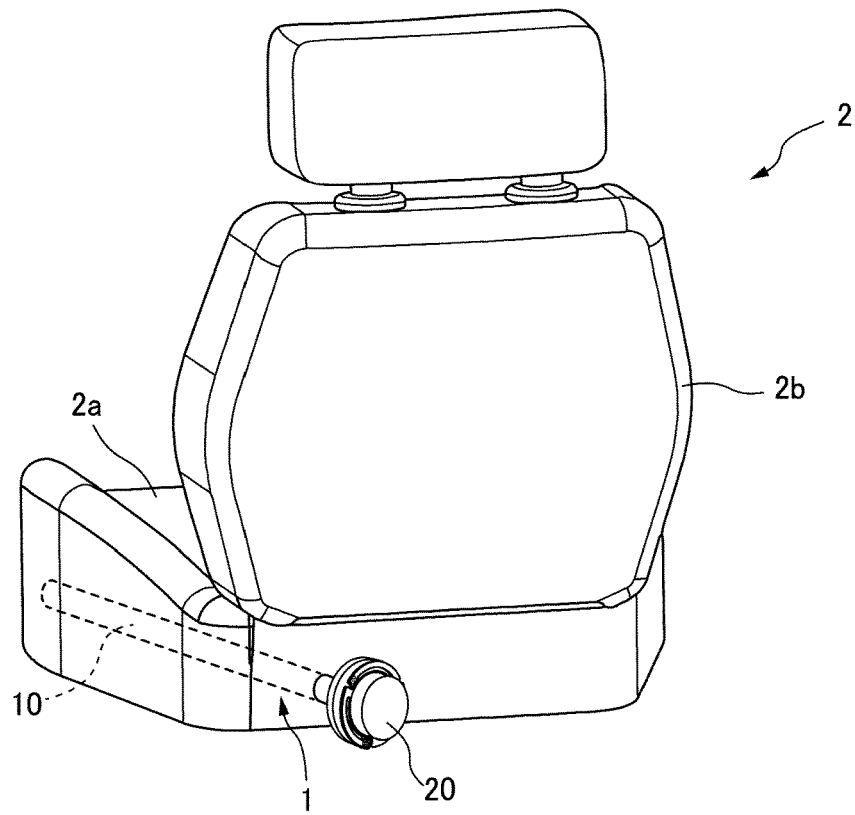
FIG.1(a)
FIG.1(b)

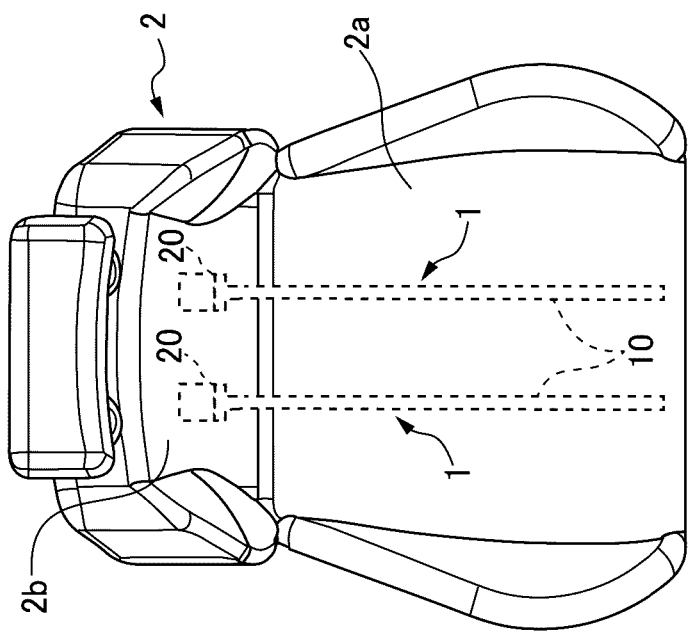
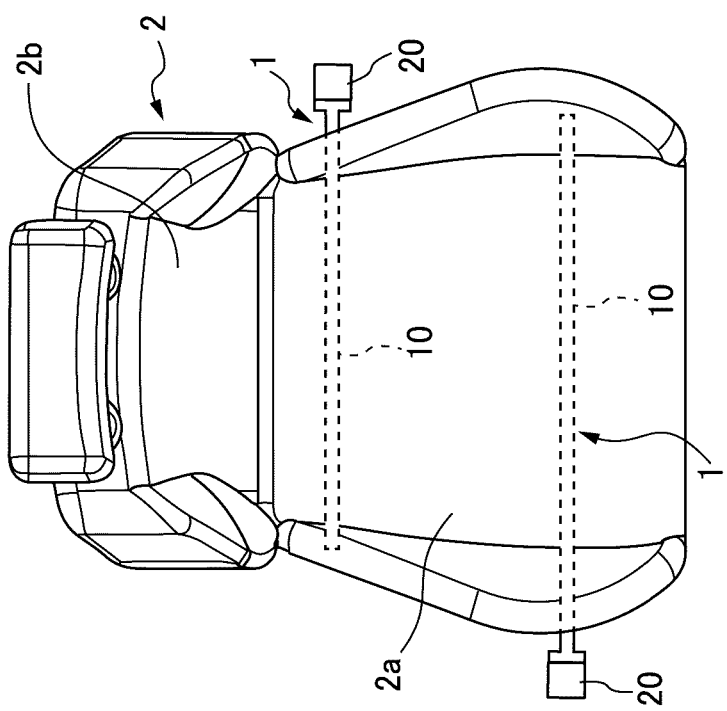

VIBRATION GENERATOR

CROSS-REFERENCE TO RELATED APPLICATION

The present application is a continuation application of the U.S. patent application Ser. No. 15/736,757 filed Dec. 14, 2017, which is a national stage of International Application No. PCT/JP2016/070234, filed Jul. 8, 2016, which claims to priority to Japanese Patent Application No. 2015-138391 filed Jul. 10, 2015. The contents of these applications are incorporated herein by reference in their entirety.

TECHNICAL FIELD

The present invention relates to a vibration generator.

BACKGROUND ART

There have been proposed vehicle alarm devices that include vibrators installed in the seat surfaces of seats and give alarms to seated persons through vibrations of the vibrators (for example, see Japanese Unexamined Patent Application Publication No. 2009-120015). The vibrator of such a vehicle alarm device is installed between the cushion of the seat surface and a seat skin so as to be in contact with the seat skin. By installing the vibrator between the cushion and the seat skin so as to be in contact with the seat skin, the vibrator contacts a seated person through the seat surface. Thus, a vibration can be transmitted to the seated person more efficiently.

Since an alarm is given to the seated person through the vibration of the vibrator, the seated person can be caused to feel the alarm through the vibration even if the seated person is driving the vehicle.

SUMMARY

A vibration generator of one aspect of the present invention includes a vibration transmission member disposed in a seat beneath a seat surface of the seat so as to extend longitudinally in a horizontal direction of the seat surface and configured to transmit a vibration in an extending direction of the vibration transmission member in which the vibration transmission member extends longitudinally and an exciter including a voice coil, a permanent magnet disposed in the vicinity of the voice coil, a yoke supporting the permanent magnet. The exciter transmits the vibration to the vibration transmission member as the yoke and the voice coil approach or leave to each other. The yoke and the voice coil approach or leave in the same direction as the extending direction of the vibration transmission member.

Advantageous Effects of Invention

The vibration generator according to an embodiment of the present invention transmits the vibration of the exciter in the extending direction of the vibration transmission member extending in the horizontal direction of the seat surface. Thus, the vibration generator is able to transmit a vibration in the horizontal direction, which is not the vertical direction, in which the weight of a seated person is applied to the seat surface. Since the vibration can be transmitted in the direction different from the vertical direction, in which the cushion or the like of the seat surface is more likely to be expanded or contracted by a pressure, the vibration is less likely to be attenuated and the seated person is more likely to feel the vibration.

Also, by adjusting or setting the frequency of a vibration outputted by the exciter to the frequency at which the vibration transmission member is resonated, the frequency at which the seat surface having the vibration transmission member disposed therein or the entire seat is resonated, or the like, the vibration transmission member or entire seat can be caused to output a resonant vibration. Thus, the seated person can be caused to feel the vibration more effectively and reliably.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

FIGS. 1(a) and 1(b) show a schematic configuration of a vehicle seat provided with a vibration generator according to an embodiment, in which FIG. 1(a) shows a plan view of the seat; and FIG. 1(b) shows a rear perspective view of the seat.

FIGS. 5(a) and 5(b) show other examples in which the vibration generator according to the embodiment is disposed in the seat surface of the vehicle seat.

DESCRIPTION OF EMBODIMENTS

Figure 2:
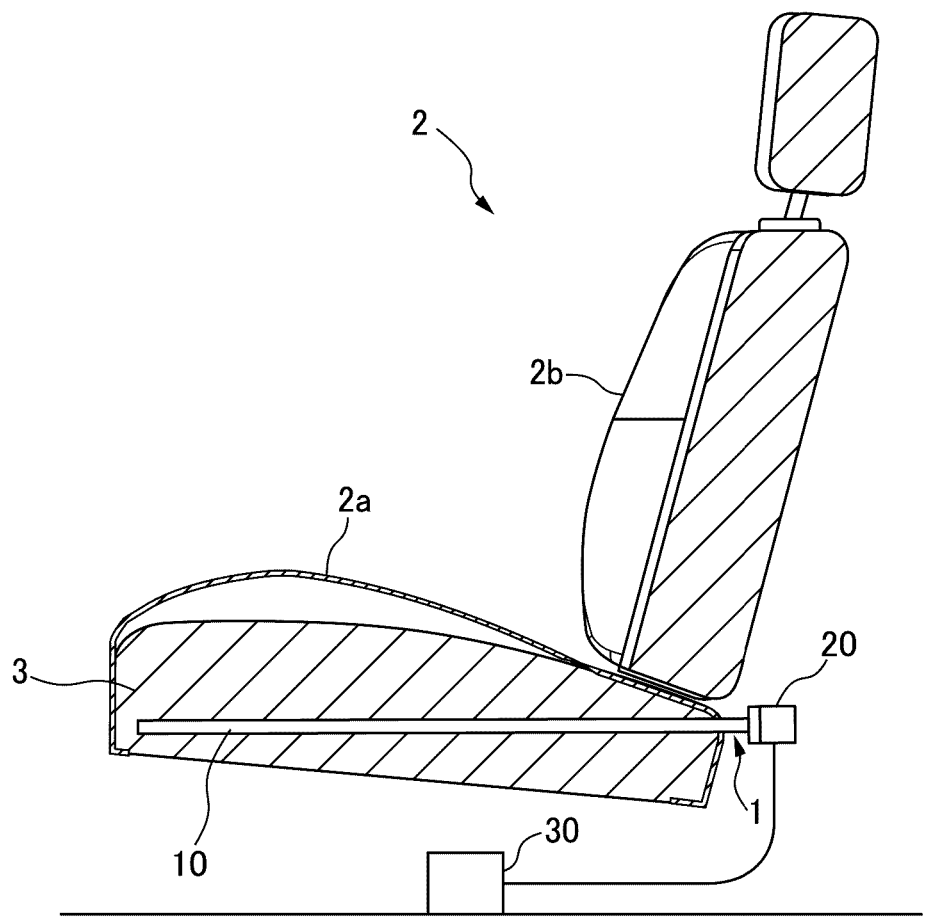
FIG. 2 is a side sectional view of the vehicle seat provided with the vibration generator according to the embodiment.

The embodiments will now be described with reference to the accompanying drawings, wherein like reference numerals designate corresponding or identical elements throughout the various drawings.

Now, an example of a vibration generator according to the present invention will be described in detail with reference to the drawings. FIGS. 1(a), 1(b), and 2 are drawings showing a schematic configuration of a vehicle seat 2 provided with a vibration generator 1 according to an embodiment. FIG. 1(a) shows a plan view of the seat, and FIG. 1(b) shows a rear perspective view of the seat. FIG. 2 shows a side sectional view of the seat.

As shown in FIGS. 1(a), 1(b), and 2, the vibration generator 1 roughly includes a vibration transmission member 10 and an exciter 20 and is disposed in a seat surface 2a of the vehicle seat 2. The vibration transmission member 10 is a cylindrical, bar-shaped member and is formed of a rigid body so that a vibration is easily transmitted thereby. For example, a metal such as iron is used as the vibration transmission member 10. However, the material of the vibration transmission member 10 is not limited to a metal and may be of any type as long as it easily transmits the vibration of the exciter 20.

Also, the vibration transmission member 10 need not be cylindrical, as long as it is a bar-shaped member. It preferably has a roughly circular sectional shape, but may have a polygonal sectional shape such as a triangular or rectangular one. Note that if the vibration transmission member 10 has a triangular, square, or any like sectional shape, care must be taken so that it does not affect the sitting comfort of the seated person. On the other hand, if it has a roughly circular sectional shape, it has no angular portion that hits a buttock, thigh, or the like. Thus, the sitting comfort or the like can be improved.

In the vehicle seat 2, a seat frame (not shown) forms a skeleton. The seat surface 2a and backrest 2b of the vehicle seat 2 are filled with an elastic member such as a cushion 3 for dispersing the pressure from the seated person (the weight of the seated person and the pressure applied to the backrest 2b), as well as for improving the sitting comfort or the like of the seated person.

The vibration transmission member 10 is disposed so as to be buried in the cushion 3 of the seat surface 2a. One specific method for burying the vibration transmission member 10 involves performing insert molding so that the cushion 3 is molded with the vibration transmission member 10 inserted. Another method involves forming an insertion hole for inserting the vibration transmission member 10 in a molded cushion 3, inserting the vibration transmission member 10 into the hole, and then fixing the vibration transmission member 10 to the cushion 3 using an adhesive or the like.

The vibration transmission member 10 is buried in the cushion 3. The vibration transmission member 10 is also disposed in the vehicle seat 2 so as not to contact a member, such as a seat frame, that easily transmits the vibration of the vibration transmission member 10 so that the vibration escapes. The vibration transmission member 10 may be provided with a lock configured to be caught on the cushion 3, a fold configured not to come out, or the like so as to prevent itself from coming out of the seat surface 2a due to the vibration.

As shown in FIGS. 1(a) and 1(b), the vibration transmission member 10 is disposed in the seat surface 2a in such a manner that the rear end thereof (the end on which the exciter 20 is mounted) is located in a position close to the center of the rear end of the seat surface 2a and the front end thereof is located near the left end (in a position close to the left side) of the front end of the seat surface 2a. Typically, angle adjustment mechanisms for adjusting the angle of the backrest 2b are disposed in left and right positions of the junction (a rear portion of the seat surface 2a) of the seat surface 2a and backrest 2b of the vehicle seat 2. For this reason, the rear end of the vibration transmission member 10 is preferably disposed in a position close to the center of the rear end of the seat surface 2a so that the rear end is avoided from being located in the disposition areas of the angle adjustment mechanisms in the seat surface 2a.

As described above, the vibration transmission member 10 is disposed in the seat surface 2a in such a manner that the rear end thereof is located in a position close to the center of the rear end of the seat surface 2a and the front end thereof is located near the left end (in a position close to the left side) of the front end of the seat surface 2a. By disposing the vibration transmission member 10 in the seat surface 2a in this manner, the vibration transmission member 10, which is a bar-shaped member, is disposed so as to cross a thigh of the seated person from the inside to outside thereof.

Preferably, the front end of the vibration transmission member 10 is located in a position as close as possible to the front of the seat surface 2a and as close as possible to the left side thereof while taking care so that the seated person does not have a strange feeling of sitting. By disposing the front end of the vibration transmission member 10 in a position as close as possible to the front of the seat surface 2a and as close as possible to the left side thereof, a vibration can be generated over a wide range. Thus, the seated person can be caused to feel the vibration in a wider range of his or her body.

While the single vibration transmission member 10 alone is shown in FIGS. 1(a), 1(b) and FIG. 2 for the convenience of description, a pair of vibration transmission members 10 may be disposed in the seat surface 2a. For example, a pair of vibration transmission members 10 are disposed in the seat surface 2a in such a manner that the rear ends of the vibration transmission members 10 are located in positions close to the center of the rear end of the seat surface 2a and the front ends of the vibration transmission member 10 are located near the left end (a position close to the left side) and the right end (a position close to the right side) of the front end of the seat surface 2a. By disposing the vibration transmission members 10 in the seat surface 2a in this manner, the vibration transmission members 10 can be disposed in an inverted v shape in a plan view of the seat surface 2a.

As shown in FIGS. 1(a), 1(b), and 2, the exciter 20 is mounted on the rear end of the vibration transmission member 10. More specifically, the exciter 20 is secured to the rear end of the vibration transmission member 10 with a frame 21 (see FIG. 3) of the exciter 20 brought into contact with the section of the rear end. The exciter 20 is also secured to the vibration transmission member 10 so as not to contact a member other than the vibration transmission member 10. By securing the exciter 20 to the vibration transmission member 10 in this manner, the vibration of the exciter 20 is prevented from being easily transmitted to a member other than the vibration transmission member 10, for example, the seat frame of the vehicle seat 2 and thus the vibration is prevented from escaping. The exciter 20 is a sound output device that is able to transmit a vibration force transmitted from a voice coil to an object in contact with the main body of the exciter and to cause the object to output a vibration and a sound.

Figure 3:
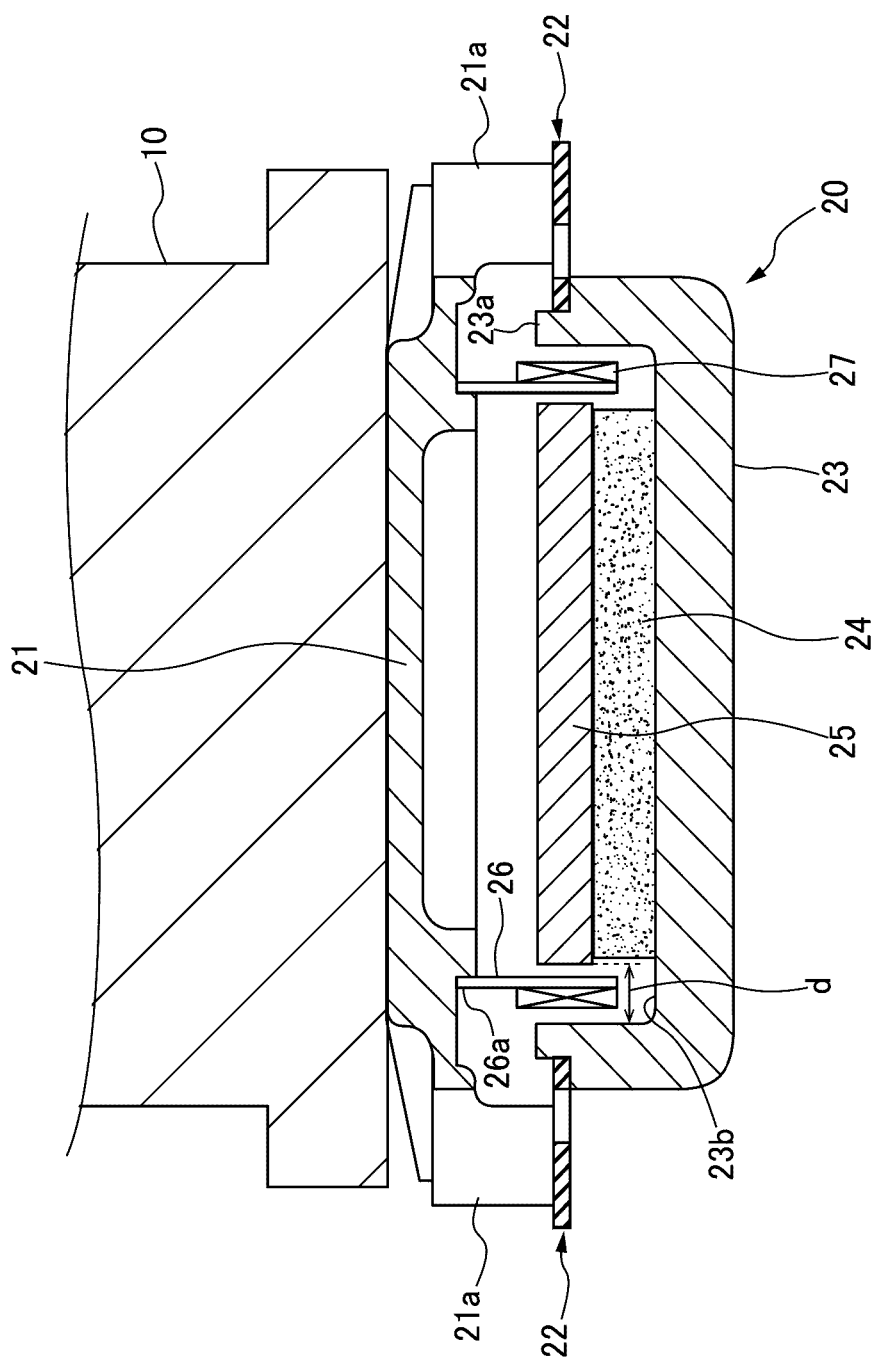
FIG. 3 is a sectional view showing a schematic configuration of an exciter according to the embodiment.

FIG. 3 is a sectional view showing a schematic structure of the exciter 20. FIG. 3 shows an aspect in which the exciter 20 is secured to the rear end of the vibration transmission member 10. The exciter 20 roughly includes the frame 21, multiple dampers 22, an outer yoke 23, a permanent magnet 24, an inner yoke 25, a bobbin 26, and a voice coil 27.

The outer yoke 23 consists of a sidewall 23a and a bottom 23b that are continuously formed, and is in a hollow shape. The permanent magnet 24 is mounted on the inside of the bottom 23b of the outer yoke 23 and is in the shape of a disc. The inner yoke 25 is placed on the permanent magnet 24. The inner yoke 25 is in the shape of a disc. The inner yoke 25 has a slightly larger diameter than the permanent magnet 24.

A clearance d is provided between the inner surface of the sidewall 23a of the outer yoke 23 and the circumferential surface of the inner yoke 25. One end of the cylindrical bobbin 26 is located in the clearance d. A voice coil 27 is wound about the one end of the bobbin 26.

The frame 21 has a pan shape having a larger diameter than the outer diameter of the outer yoke 23 so that it can cover the hollow shape of the outer yoke 23. Formed on the outer edge of the frame 21 is a leg 21a protruding toward the outer yoke 23. The side opposite to the side from which the leg 21a protrudes, of the pan-shaped frame 21 is secured to the section of the rear end of the vibration transmission member 10.

The base 26a of the bobbin 26 is secured to the side opposite to the side secured to the section of the vibration transmission member 10, of the pan-shaped frame 21. The dampers 22 are disposed at equal intervals on the leg 21a of the frame 21 so as to extend approximately helically in the circumferential direction of the frame 21. One ends (the center-side helical ends) of the dampers 22 are fixed to the periphery of the sidewall 23a of the outer yoke 23.

When a sound generator 30 shown in FIG. 2 provides a sound signal to the voice coil 27 of the exciter 20 thus configured, the bobbin 26 vibrates in accordance with the frequency of the sound signal. More specifically, the bobbin 26 vibrates in the direction in which the outer yoke 23 approaches or leaves the frame 21 (in the vertical direction of FIG. 3) through the dampers 22. The vibration of the bobbin 26 is transmitted to the vibration transmission member 10 through the frame 21. The vibration is applied to the vibration transmission member 10 in the extending direction of the vibration transmission member 10, which is a bar-shaped member. By causing the exciter 20 to transmit the vibration to the vibration transmission member 10 in the extending direction of the vibration transmission member 10, the vibration can be transmitted in the front-back direction of the vehicle seat 2.

Also, by changing or adjusting the frequency of a sound signal inputted to the exciter 20, the vibration transmission member 10 can be caused to transmit a vibration in the front-back direction. This vibration in the front-back direction can cause resonance in the vibration transmission member 10. By causing resonance in the vibration transmission member 10, the entire vibration transmission member 10 can be vibrated. Thus, the vibration can be transmitted not only in the extending direction of the vibration transmission member 10 but also over the entire vehicle seat 2.

The vibration transmission member 10, which is a bar-shaped member, is disposed in the seat surface 2a so as to cross a thigh of the seated person from the inside to outside of the thigh. Thus, by resonating the vibration transmission member 10, a wide range from a buttock to the back of the thigh can be caused to feel the vibration. Also, the seated person can be caused to reliably feel the vibration.

The vibration transmission member 10 is a bar-shaped member. By inputting a vibration generated by the exciter 20 to the bar-shaped member in the extending direction of the bar-shaped member, the entire vibration transmission member 10 can be vibrated. If the vibration transmission member 10 has, for example, a significantly curved shape, a vibration in the extending direction would be attenuated in the curved portion. Consequently, the vibration would be attenuated at the front end or the like of the vibration transmission member 10. That is, the entire vibration transmission member 10 would be difficult to vibrate. In the case of the vibration transmission member 10 according to the present embodiment, a vibration generated by the exciter 20 is inputted to the bar-shaped member in the extending direction thereof. The vibration in the extending direction significantly propagates through the bar-shaped member in the front-back direction. Accordingly, the vibration is less likely to be blocked.

In the present embodiment, a vibration generated by the exciter 20 is transmitted in the extending direction of the vibration transmission member 10 and in the front-back direction of the seat surface 2a. Thus, the vibration can be transmitted to a wide range compared to when the exciter is installed in the seat surface 2a with the exciter directed in the upward direction of the seat surface so as to transmit a vibration in the vertical direction of the seat. Also, the vibration can be transmitted in directions different from the vertical direction, in which the cushion or the like of the seat surface 2a is more likely to be expanded or contracted by a pressure. This can make the vibration less likely to be attenuated due to the compression of the cushion or the like, as well as can make the seated person more likely to feel the vibration.

The vehicle seat 2 is more likely to move vertically while the vehicle travels. For this reason, if the exciter 20 is installed in the seat surface 2a with the exciter directed in the upward direction of the seat surface, the dampers 22 of the exciter 20 may be vibrated in the vertical direction, which is the same direction as a vibration generated by the exciter 20. Vertical vibrations of the vehicle may damage the exciter 20 or reduce the performance thereof. In the case of the vibration transmission member 10 according to the present embodiment, the exciter 20 is being mounted on the vibration transmission member 10, dampers 22 of the exciter 20 vibrate in the front-back direction of the seat surface 2a. Thus, the influence of the vertical vibration of the vehicle can be reduced.

Also, the exciter 20 is disposed on the rear end of the vibration transmission member 10 so as not to contact the seat surface 2a or the like of the vehicle seat 2. Thus, the vibration of the exciter 20 can be transmitted directly to the vibration transmission member 10. Further, the reduction in the vibration caused by the contact between any other member in the vehicle seat 2 and the exciter 20 can be minimized.

Also, by changing or adjusting the frequency of a sound signal inputted to the exciter 20, not only the vibration transmission member 10 but also the vehicle seat 2 and seat surface 2a can be resonated. The performance of the cushion of the vehicle seat 2 deteriorates with time due to the sitting of persons on the vehicle seat 2, or the like. For this reason, the resonant frequency of the vehicle seat 2 and seat surface 2a is more likely to vary with time. However, the vehicle seat 2 and seat surface 2a can be resonated by changing or adjusting the frequency of a sound signal inputted to the exciter 20. As a result, it is possible to more effectively generate a vibration in accordance with the state of the vehicle seat 2 and seat surface 2a to enhance the vibration feeling performance of the seated person.

The vibration generator 1 of the present embodiment causes the exciter 20 to output a vibration to the vibration transmission member 10. The vibration generator 1 thus configured can cause the exciter 20 to output not only a vibration but also music or the like to the vibration transmission member 10 by changing or adjusting the frequency or the like of a sound signal inputted to the exciter 20. Thus, the vibration generator 1 can be used as a sound device that outputs not only vibrations but also sounds.

While the example of the vibration generator of the present invention has been described in detail with reference to the drawings, the vibration generator of the present invention is not limited to the example described in the embodiment. It is apparent that those skilled in the art can conceive of various changes or modifications thereto without departing from the scope set forth in the claims. Such changes or modifications can produce effects similar to those of the vibration generator 1 according to the embodiment.

For example, in the above description, the vibration transmission member 10 of the vibration generator 1 according to the embodiment is disposed in the seat surface 2a in such a manner that the rear end thereof is located in a position close to the center of the rear end of the seat surface 2a and the front end thereof is located near the left end (a position close to the left side) of the front end of the seat surface 2a, as shown in FIGS. 1(a), 11(b) and FIG. 2.

However, the vibration generator 1 need not be disposed in the position shown in FIGS. 1(a), 1(b) and FIG. 2.

Figure 4A:
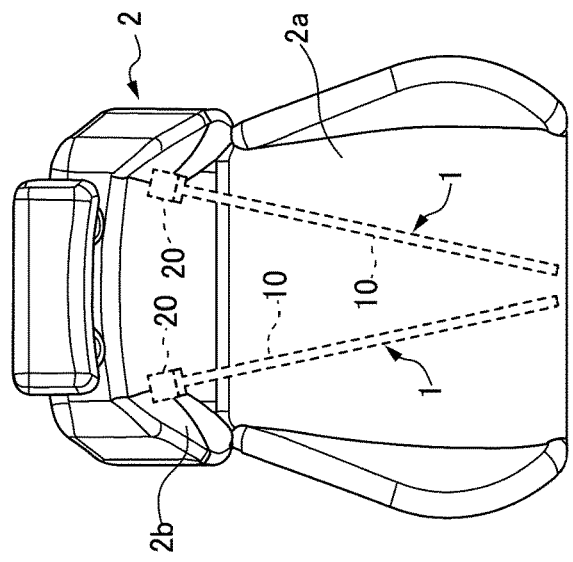
FIGS. 4(a), 4(b), and 4(c) show other examples in which the vibration generator according to the embodiment is disposed in the seat surface of the vehicle seat.

For example, as shown in FIG. 4(a), the vibration transmission member 10 may be disposed in the seat surface 2a in such a manner that the rear end thereof (the end on which the exciter 20 is mounted) is located near the left end (or near the right end) of the front end of the seat surface 2a and the front end thereof is located in a position close to the center in the left-right direction of the rear end of the seat surface 2a. In this case, the vibration transmission member 10 is buried in the cushion of the seat surface 2a in a state in which the exciter 20 secured to the rear end of the vibration transmission member 10 is located in front of the vehicle seat 2 and the front end of the vibration transmission member 10 is located at the rear end of the seat surface 2a. Even if the vibration transmission member 10 is disposed in the seat surface 2a in this manner, the seated person can be caused to feel an effective vibration thanks to resonance or the like, as with the vibration transmission member 10 according to embodiment.

Figure 4B:
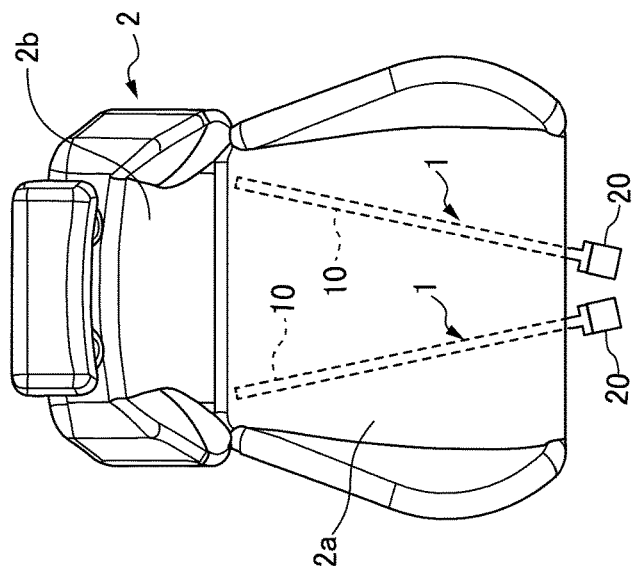

Also, as shown in FIG. 4(b), the vibration transmission member 10 may be disposed in the seat surface 2a in such a manner that the rear end thereof (the end on which the exciter 20 is mounted) is located near the center in the left-right direction of the front end of the seat surface 2a and the front end thereof is located near the left end (or near the right end) of the rear end of the seat surface 2a. Also in this case, the vibration transmission member 10 is buried in the cushion of the seat surface 2a in a state in which the exciter 20 secured to the rear end of the vibration transmission member 10 is located in front of the vehicle seat 2 and the front end of the vibration transmission member 10 is located at the rear end of the seat surface 2a. Even if the vibration transmission member 10 is disposed in the seat surface 2a in this manner, the seated person can be caused to feel an effective vibration thanks to resonance or the like, as with the vibration transmission member 10 according to the embodiment.

Figure 4C:
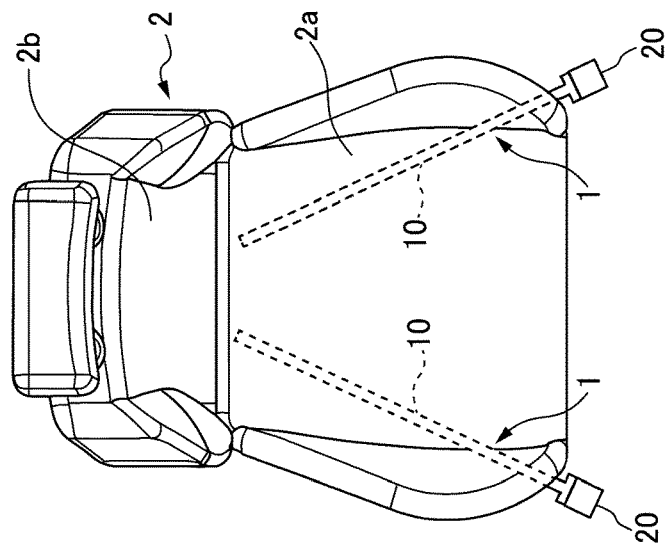

Also, as shown in FIG. 4(c), the vibration transmission member 10 may be disposed in the seat surface 2a in such a manner that the front end thereof is located near the center in the left-right direction of the front end of the seat surface 2a and the rear end thereof (the end on which the exciter 20 is mounted) is located near the left end (or near the right end) of the rear end of the seat surface 2a. In this case, the vibration transmission member 10 is buried in the cushion of the seat surface 2a in a state in which the exciter 20 secured to the rear end of the vibration transmission member 10 is located in the rear of the vehicle seat 2 and the front end of the vibration transmission member 10 is located at the front end of the seat surface 2a. Even if the vibration transmission member 10 is disposed in the seat surface 2a in this manner, the seated person can be caused to feel an effective vibration thanks to resonance or the like, as with the vibration transmission member 10 according to the embodiment.

As another method, the vibration transmission member 10 may be disposed in the left-right direction of the seat surface 2a, as shown in FIG. 5(a). Also, a pair of vibration transmission members 10 extending in the front-back direction may be disposed in parallel, as shown in FIG. 5(b).

While, in the vibration generator 1 according to the embodiment, the exciter 20 is secured directly to the rear end of the vibration transmission member 10, the exciter 20 need not necessarily be secured directly to the vibration transmission member 10. The exciter 20 only has to be mounted on the vibration transmission member 10 in such a manner that the extending direction of the vibration transmission member 10 and the vibration transmission direction of the exciter 20 become the same direction. The use of such a mounting structure allows the vibration of the exciter 20 to be effectively transmitted in the extending direction of the vibration transmission member 10.

Accordingly, for example, there may be used a structure in which one end of a crank-shaped connection member is mounted on the rear end of the vibration transmission member 10 and the exciter 20 is mounted on the other end of the connection member. The term "crank-shaped" here refers to having a shape in which two right-angled narrow curves are alternately connected and the extending direction line of one end and the extending direction line of the other end are in parallel. If the vibration transmission member 10 is mounted to the exciter 20 through the crank-shaped connection member, the extending direction of the vibration transmission member 10 and the vibration transmission direction of the exciter 20 become paralleled and are directed to the same direction. For this reason, as with the vibration generator 1 according to the embodiment, the vibration of the exciter 20 can be transmitted in the extending direction of the vibration transmission member 10 unless the crank-shaped connection member contacts another member such as a seat frame. Thus, the vibration of the exciter 20 can be effectively transmitted in the extending direction of the vibration transmission member 10.

Also, an approximately S-shaped connection member having moderate curves rather than crank-shaped narrow curves may be used as long as the extending direction of the vibration transmission member 10 and the vibration transmission direction of the exciter 20 are directed to the same direction. Although the vibration generation direction of the exciter 20 and the extending direction of the vibration transmission member 10 are opposite to each other, there may be used a U-shaped connection member or the like where the vibration directions become the same horizontal direction.

Also, the vibration generator according to the present invention need not be disposed in the seat surface 2a. For example, the vibration generator 1 may be disposed in the backrest 2b.

Obviously, numerous modifications and variations of the present invention are possible in light of the above teachings. It is therefore to be understood that within the scope of the appended claims, the invention may be practiced otherwise than as specifically described herein.

The invention claimed is:

1. A vibration generator comprising:
   a vibration transmission member disposed in a seat beneath a seat surface of the seat so as to extend longitudinally in a horizontal direction of the seat surface and configured to transmit a vibration in an extending direction of the vibration transmission member in which the vibration transmission member extends longitudinally; and
   an exciter comprising a voice coil, a permanent magnet disposed in the vicinity of the voice coil, a yoke supporting the permanent magnet, the exciter transmitting the vibration to the vibration transmission member as the yoke and the voice coil approach or leave to each other, wherein
   the yoke and the voice coil approach or leave in the same direction as the extending direction of the vibration transmission member.

2. The vibration generator according to claim 1, wherein the vibration transmission member is a bar-shaped member formed of a rigid body.

* * * * *